Aug. 17, 1937.    P. S. STRANG    2,090,239
ELECTRIC CONDUIT AND OUTLET CHANNEL
Filed May 20, 1936    3 Sheets-Sheet 1
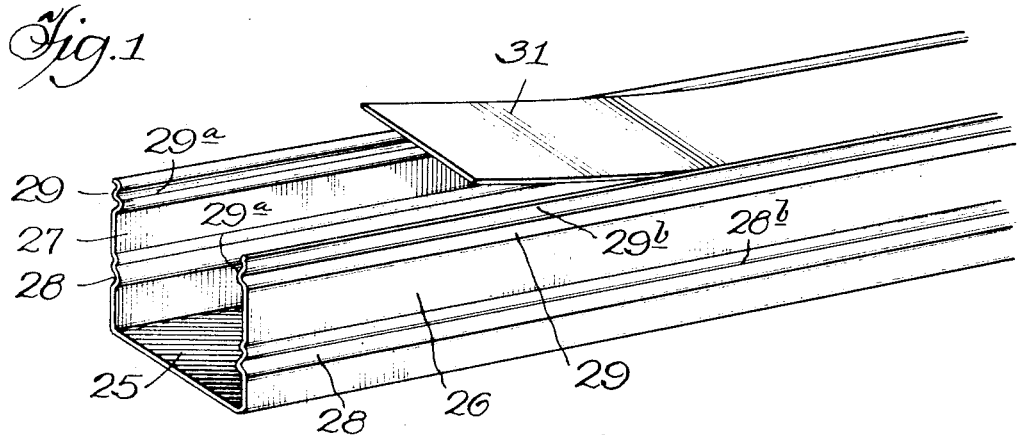
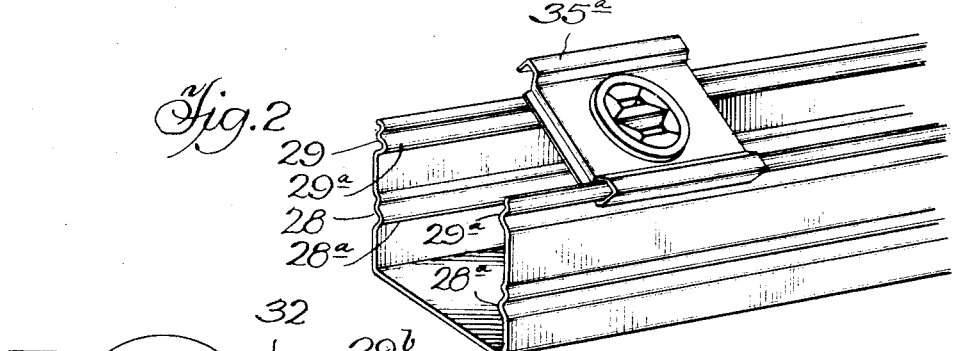
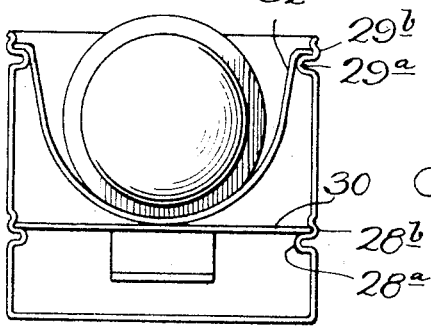
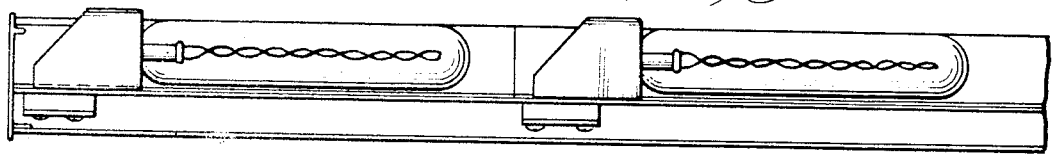
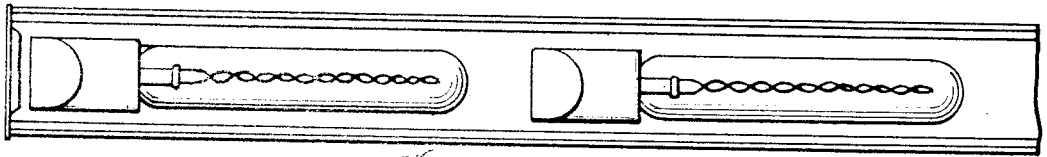

Aug. 17, 1937.  P. S. STRANG  2,090,239
ELECTRIC CONDUIT AND OUTLET CHANNEL
Filed May 20, 1936   3 Sheets-Sheet 2
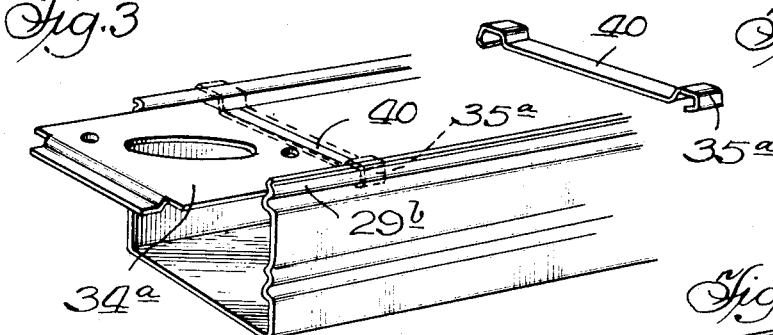
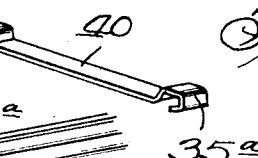
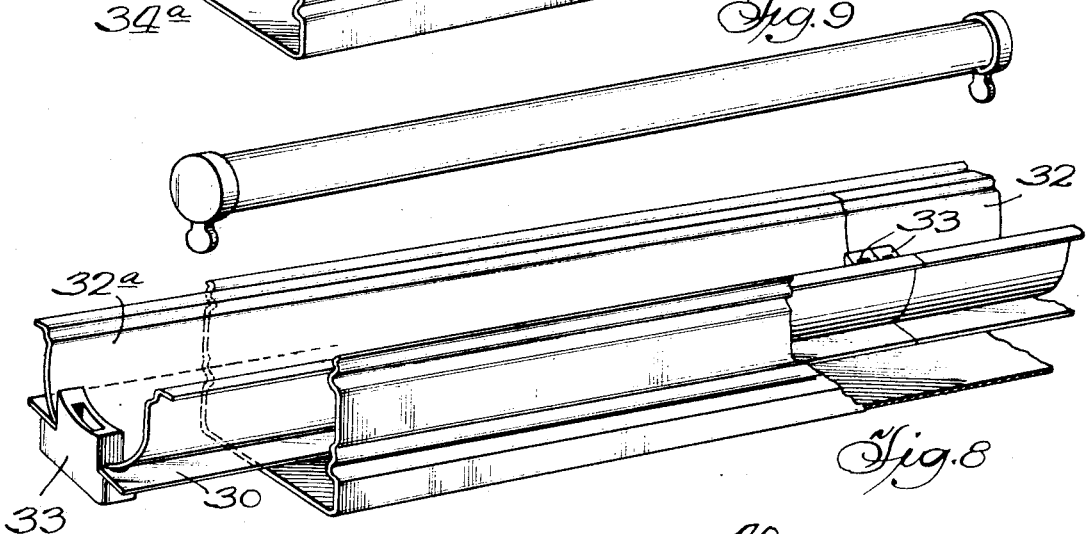
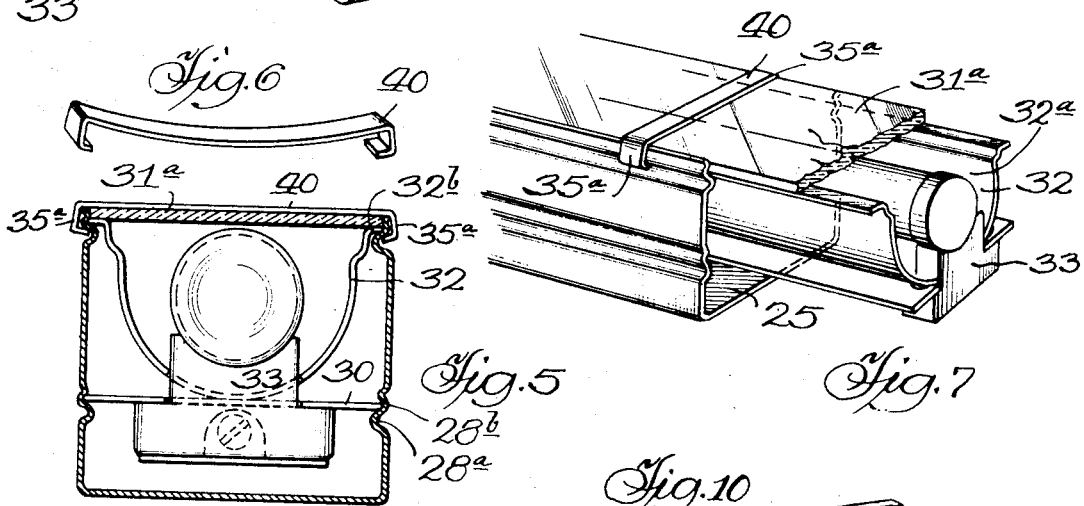
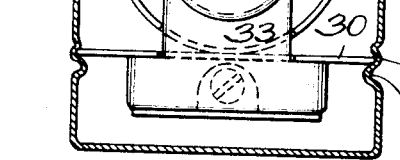
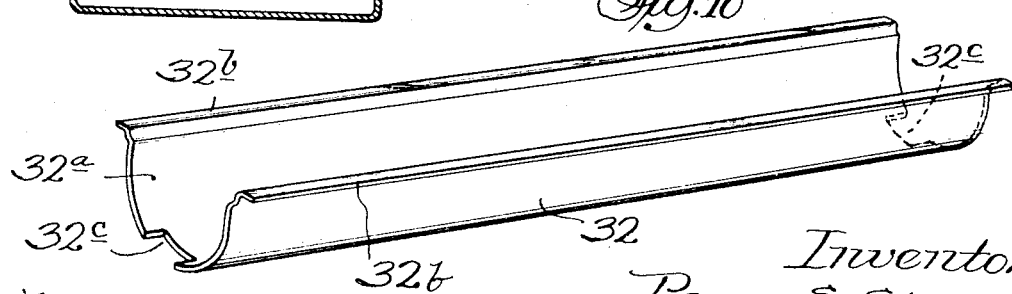

Aug. 17, 1937.  P. S. STRANG  2,090,239
ELECTRIC CONDUIT AND OUTLET CHANNEL
Filed May 20, 1936  3 Sheets-Sheet 3
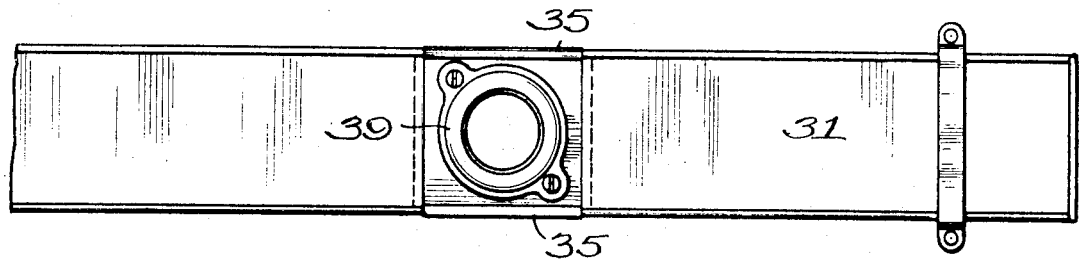
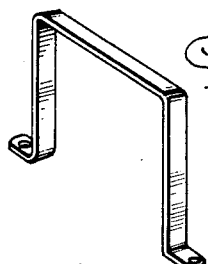
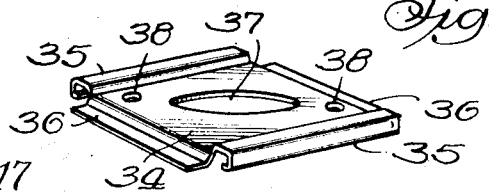
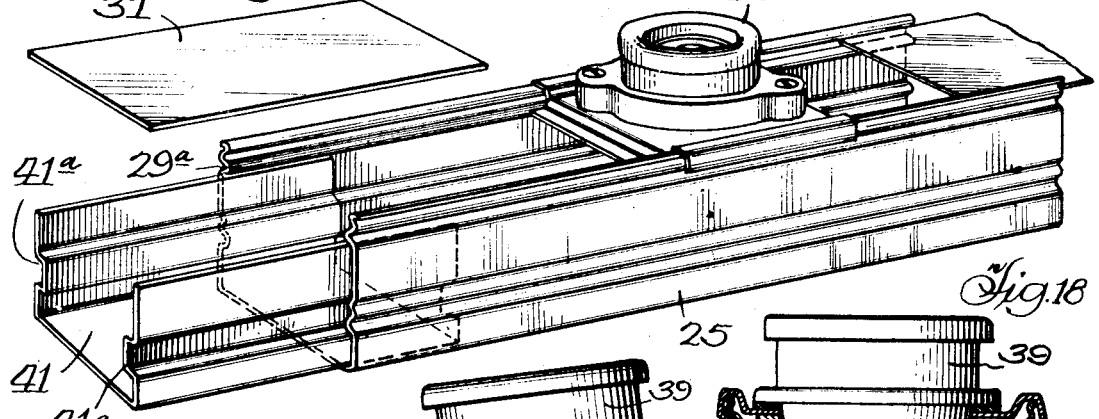
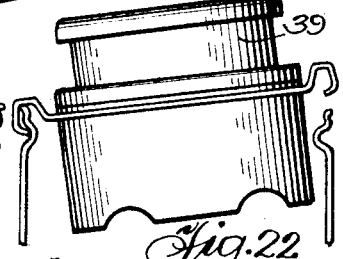
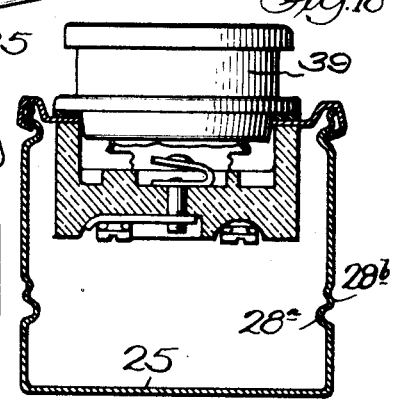
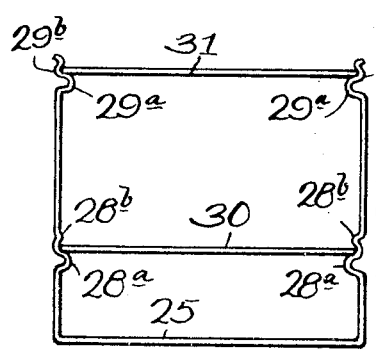
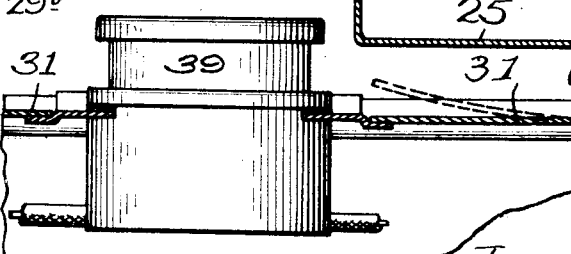
Inventor,
Perry S. Strang,

UNITED STATES PATENT OFFICE 2,090,239

ELECTRIC CONDUIT AND OUTLET CHANNEL

Perry S. Strang, Chicago, Ill.

Application May 20, 1936, Serial No. 80,652

5 Claims. (Cl. 247—37)

My present invention relates to the provision of an electric conduit and outlet channel. Such a channel is employed mostly in installing electric illumination in connection with cove and window lighting and in display counters and cabinets and is for the purpose of giving greater protection to the conduits and forming a more rigid support for the outlet fittings and such other lighting equipment as may be desired in particular installations. Such channels are formed from strips of sheet metal of suitable gauge or thickness and do not generally have the strength or dependability of standard tubular conductor conduit.

It has been my object in designing the channel hereinafter described and illustrated to provide a structure which, when assembled, will latch or lock together, thereby increasing its strength and dependability.

I have also had in mind the provision of a channel which will more certainly and dependably protect the conductor and will also receive, as may be desired, the standard forms of outlet fittings, such as sockets, and in which reflectors and lighting bulbs may be mounted and also covered. My channel will house conductors for a number of circuits.

Still another object I have had in mind is to provide a channel in standard unit parts with means for joining both electrically and structurally such parts so as to secure a channel of any desired length.

I have accomplished the foregoing objects by means of the structure illustrated in the accompanying drawings, in which—

Fig. 1 is a perspective of a portion of a channel formed in accordance with my present invention with a cover plate partially assembled therewith.

Fig. 2 is a view similar to Fig. 1 except that instead of a cover plate I have shown a locking and socket carrying plate partially assembled with the channel.

Fig. 3 is a view similar to Fig. 2, except I have shown a different form of socket carrying plate and a latch bar assembled with the channel.

Fig. 4 is a view of the latch bar shown in Fig. 3, detached from the channel.

Fig. 5 is a transverse section of the channel assembled with a partition providing a bottom conduit channel and socket support, a reflector, a glass cover plate and a latching bar.

Fig. 6 is a view of the latching bar shown in Fig. 5 detached.

Fig. 7 shows how the assembly in Fig. 5 may be secured by sliding the partition with the socket attached, the reflector and the cover plate in from the end of the channel.

Fig. 8 is a view similar to Fig. 7 with the cover plate, lamp and latching bar omitted but showing a juncture of two lengths of reflector.

Fig. 9 is a perspective detail of the form of lamp employed in the assembly shown in Figs. 5, 7 and 8.

Fig. 10 is a view of the reflector employed, detached from the assembly.

Fig. 11 is a transverse section through an assembly much like Fig. 5 except that the cover plate is omitted and a lamp of larger diameter employed.

Fig. 12 is a longitudinal sectional view through an assembly employing laterally opening double contact sockets.

Fig. 13 is a top plan of the structure shown in Fig. 12.

Fig. 14 is a top plan of an assembly with a socket carrying plate and also with a bow handy for securing the assemblies in position.

Fig. 15 is a perspective detail of the securing bow shown in Fig. 14 separate from the assembly.

Fig. 16 is a perspective detail of a form of locking and outlet securing plate detached from the assembly.

Fig. 17 is a detail of a plate which may be employed either as a partition or cover plate.

Fig. 18 is a perspective of a unit assembly with a coupling fitting by means of which the unit assemblies may be joined to lengthen the installation.

Fig. 19 is a transverse section of a channel with the partition and cover plates assembled.

Fig. 20 is a fragmental detail showing how a plate may be snapped into position from the side instead of slid into position from the end.

Fig. 21 is a detail assembly of a channel, a socket carrying plate and a cover plate.

Fig. 22 is a fragmental detail showing how the socket carrying plate may be snapped on instead of being slid in from the end, and Fig. 23 is a transverse section through a channel, an outlet socket holding plate and a double contact socket assembled with such a plate.

Similar reference characters refer to similar parts throughout the respective views.

The channel is rectangular in cross section and, as most clearly seen from reference to Figs. 1 and 2, consists of integral bottom connecting wall 25 and parallel side walls 26 and 27. In the side walls 26 and 27 are provided bottom rows of beading 28 and top rows of beading 29.

As most clearly shown in Fig. 11 each of these rows of beading comprises a relatively large, inwardly extending bead 28a or 29a, as the case may be. This bead provides a shoulder or seat for receiving and supporting the partition 30 and the cover plate 31 in the respective cases. The upper, inwardly extending bead 29a also supports, when such parts are used, the edge flange of the reflector 32 and the edges of the cover 31a when such parts are used, as shown in Fig. 5.

Immediately above the relatively deep, inwardly extending beads 28a and 29a are relatively shallow outwardly extending beads 28b and 29b which, in each case, prevent the vertical displacement of the elements supported by the lower, relatively larger beads.

Such a construction will permit the assembly with the channel of the partition, cover plate, or reflector, by either inserting these parts from the top and snapping them into position, or sliding them into the channel from either of its ends.

The presence of the transverse partition and transverse cover plate renders the assembly substantially as strong and dependable as the standard tubular conduit which is of considerably greater weight. Of course, the purpose of a conduit is to lead the conductor to an outlet or lighting fixture.

I have shown a standard form of single contact socket 33, in Fig. 8, directly assembled with the partition plate 30 by notching and perforating an end of the partition plate and screwing the socket to said plate by means of machine screws passing through said perforations in the usual manner.

In Fig. 16 I have shown a socket holding plate 34 with rolled longitudinal edges 35 which go over the tops of the side walls 26 and 27 and fit into the depression provided in forming the upper, inwardly extending beads 29a. The ends 36 of the plate 34 are depressed to extend under the ends of the cover plates 31, thereby latching or locking the assembly together except when the cover plates are removed by longitudinal withdrawal, or separated sufficiently to permit of being snapped out.

In Fig. 16 I have shown a central perforation 37 in the plate 34 for receiving the socket or other outlet fitting, of which there are a variety of standard forms and structures. In the plate 34 are also provided screw holes 38 for securing the socket or outlet fitting 39 in position, as is most clearly shown in Fig. 18.

In Fig. 3 I have shown a somewhat modified form of socket or outlet holding plate 34a which differs from the plate 34 shown in Fig. 16 in that the rolls 35 are omitted from the lateral edges of the plate, and these lateral edges are snapped into or slid into the outwardly extending beads 29b. When the form 34a of the socket or outlet carrying plate is employed, I also employ latching or locking straps 40, as most clearly shown in Figs. 3 and 4. These latching or locking straps 40 are relatively narrow and on the ends thereof are provided rolls 35a similar in all respects to the rolls 35 heretofore described in connection with plate 34.

The form of reflector conveniently and advantageously employed in my channel assembly is shown detached most clearly in Fig. 10. Such a reflector, 32, has the central longitudinal curved portion 32a of a suitable curvature to reflect the light as desired in the particular installation and from each longitudinal edge extends a horizontal flange 32b which is adapted to slide or snap into the outwardly extending beads 29b. The ends of the bottoms of the curved portions of the reflectors are preferably notched out at 32c to accommodate the sockets or other outlet fittings and bring the reflector to the end of the unit section of channel, as, I have found, that if the portions assembled with the channel abut end to end, a more rigid assembly is secured.

In Figs. 5 and 7 I have shown that if a suitable size reflector 32 and a suitable size light bulb is employed, a glass or other transparent cover plate 31a may be employed which renders my channel a complete illuminating fixture from which dust, or other foreign matter, is excluded.

In Fig. 18 I have shown a coupling element 41 which is also a channel, preferably of a size to telescope within the outer channel. This coupling member has provided in its side walls an inwardly extending groove 41a of suitable dimensions to contain both of the beads 28a and 28b. The tops of the side walls of the coupling member 41 preferably terminate just below the upward, inwardly extending beads 29a.

From the foregoing description taken in connection with the drawings it will be seen that I provide a channel for electric conduit and outlet fittings which, for the weight of metal employed, is sturdy and dependable and which may be readily employed with any of the standard forms and disposition of illuminating equipment. It should be borne in mind that the parts for making the different installations are few and simple and may be easily cut transversely for shortening or coupled with the coupling described.

Having described my invention what I claim as new and desire to secure by Letters Patent is:

1. An electric conduit and outlet channel comprising a channel of rectangular section having a spaced pair of reverse curved beads in each parallel wall, a partition plate and cover plate, the edges whereof co-operate with opposing reverse curved beads of said respective pairs of beads and a latching element adapted to prevent the separation of the side walls of said channel.

2. An electric conduit and outlet channel comprising a channel of rectangular section having a spaced pair of reverse curved beads in each parallel wall, a partition plate and cover plate, the edges whereof co-operate with opposing reverse curved beads of said respective pairs of beads and a latching element adapted to receive and support an outlet fitting and engaging the side walls of said channel to prevent a separation thereof.

3. An electric conduit and outlet channel comprising a channel of rectangular section, the parallel walls whereof are provided with a plurality of spaced reverse beads adapted to receive and support elements extending between opposing beads in the respective walls and means for latching the above specified assembly in assembled relation against collapsing and distention.

4. An electric conduit and outlet channel comprising a channel of rectangular section, the parallel walls whereof are provided with a plurality of spaced reverse beads adapted to receive and support elements extending between opposite rows of beads in the respective walls and means for latching the above specified assembly in assembled relation consisting of an element engaging the sides of the channel and preventing the separation thereof, said element being provided with a projection extending below the adjacent transversely extending element.

5. An electric conduit and outlet channel comprising a channel of rectangular section, the parallel walls whereof are provided with a plurality of spaced reverse beads adapted to receive and support elements extending between opposite rows of beads in the respective walls and means for latching the above specified assembly in assembled relation consisting of an element engaging the sides of said channel and preventing the separation thereof, said element having an extension entering between said walls which prevents the collapsing thereof.

PERRY S. STRANG.